United States Patent [19]
Zander

[11] Patent Number: 5,133,863
[45] Date of Patent: Jul. 28, 1992

[54] STRIPPING DEVICE FOR ROTARY FILTERS

[75] Inventor: Hans G. Zander, Krefeld, Fed. Rep. of Germany

[73] Assignee: Bayer Aktiengesellschaft, Fed. Rep. of Germany

[21] Appl. No.: 434,434

[22] Filed: Nov. 13, 1989

[30] Foreign Application Priority Data

Nov. 19, 1988 [DE] Fed. Rep. of Germany ....... 3839169

[51] Int. Cl.$^5$ ............................................. B01D 33/46
[52] U.S. Cl. .................... 210/396; 210/400; 210/407; 15/250.38; 15/256.5
[58] Field of Search ............ 15/250.36, 250.38, 256.5, 15/256.51; 210/396, 397, 400, 402, 407, 408, 414

[56] References Cited

U.S. PATENT DOCUMENTS

| | | | |
|---|---|---|---|
| 1,411,907 | 4/1922 | Brunner | 15/256.51 |
| 1,455,210 | 5/1923 | Keller | 210/396 X |
| 1,612,250 | 12/1926 | Ashby | 15/256.51 |
| 1,781,389 | 11/1930 | Heritage | 210/396 X |
| 1,857,808 | 5/1932 | Diederichs | 15/256.5 |
| 1,907,623 | 5/1933 | Vickery | 15/256.51 |
| 1,945,761 | 2/1934 | Vickery | 15/256.51 |
| 2,050,007 | 8/1936 | Keith et al. | 210/402 |
| 2,399,538 | 4/1946 | Berry | 15/256.51 X |
| 3,869,389 | 3/1975 | Rokitansky | 210/396 X |
| 4,146,484 | 3/1979 | Campbell | 210/396 |
| 4,147,634 | 4/1979 | Wegener | 210/396 |
| 4,265,358 | 5/1981 | Veenhof | 15/256.5 X |
| 4,305,821 | 12/1981 | Crandall et al. | 210/396 |
| 4,434,522 | 3/1984 | Linzberger | 15/256.51 |
| 4,498,988 | 2/1985 | Fujita et al. | 210/397 |

FOREIGN PATENT DOCUMENTS

| | | |
|---|---|---|
| 579288 | 6/1933 | Fed. Rep. of Germany ...... 210/396 |
| 925944 | 4/1955 | Fed. Rep. of Germany ...... 210/396 |
| 1071670 | 12/1959 | Fed. Rep. of Germany . |
| 2059137 | 6/1972 | Fed. Rep. of Germany . |
| 3243683 | 6/1983 | Fed. Rep. of Germany . |
| 458670 | 12/1926 | United Kingdom . |
| 1335196 | 10/1973 | United Kingdom . |

Primary Examiner—Robert Spitzer
Attorney, Agent, or Firm—Connolly & Hutz

[57] ABSTRACT

An improved stripping device effectively strips filter cake from the belt of a rotary belt filter while avoiding damage to the belt. A cross bar type body extends transversely to the filter belt and scrapers for the belt are fixed to the body and directed towards the belt. The cross bar type body is part of a tilting device which pivots about a transverse shaft arranged parallel to the cross bar type. The body is subjected to force in the form of a weight whose center of gravity is between the transverse shaft and the belt and which acts against the direction of movement of the belt. A acts against the direction of the force.

1 Claim, 1 Drawing Sheet

STRIPPING DEVICE FOR ROTARY FILTERS

This invention relates to a stripping device for rotary belt filters for removing the filter cake adhering to the belt, consisting of a cross bar type of body extending transversely to the belt and carrying fixed scrapers which are directed towards the belt.

BACKGROUND OF THE INVENTION

Filter cakes are normally removed from rotary filters by means of polypropylene scrapers or VA knives immediately behind the deflecting roller. Scraper devices of this kind for precoat filters (filters with auxiliary middle layer) are described in German Offenlegungsschrift 2,059,137. The scrapers used in these devices are normally fixed in position by reciprocating scrapers are disclosed in German Offenlegungsschrift 3,243,683. Scrapers which are pressed against the belt filter by pneumatic/hydraulic means and automatically reposition themselves are also known in the art (DE 3,243,683).

These scrapers or knives have the serious disadvantage that they frequently damage the belt when they scrape off the filter cake adhering to the belt. This is partly due to the fact that most of these filters have a very wide belt (e.g. >3 m) so that the belt can no longer be kept flat and is to some extent irregular over its width due to imperfections in the manufacturing process and partly due to the fact that the filter cake is not completely scraped off but rolls up and then causes trouble or damage to the belt.

The problem therefore exists of providing a stripping device for rotary filters with belt which would avoid damage to the belt.

BRIEF DESCRIPTION OF THE INVENTION

The device of the present invention which effectively strips filter cakes from the belt of a rotary belt filter avoids damage to the belt by providing scraper blades directed toward the belt fixed to a cross bar extending transversely to the belt. The cross bar body is an integral part of a tilting means which is designed to pivot about a transverse shaft arranged generally parallel to the cross bar body and is subjected to a force acting against the direction of movement of the belt and also a stop means acting against the direction of said force is provided.

BRIEF DESCRIPTION OF THE INVENTION

The FIGURE illustrates a portion of a rotary belt filter wherein filter cake is stripped from the belt of the filter by a stripping device of the present invention.

DETAILED DESCRIPTION OF THE INVENTION

Figure 1:
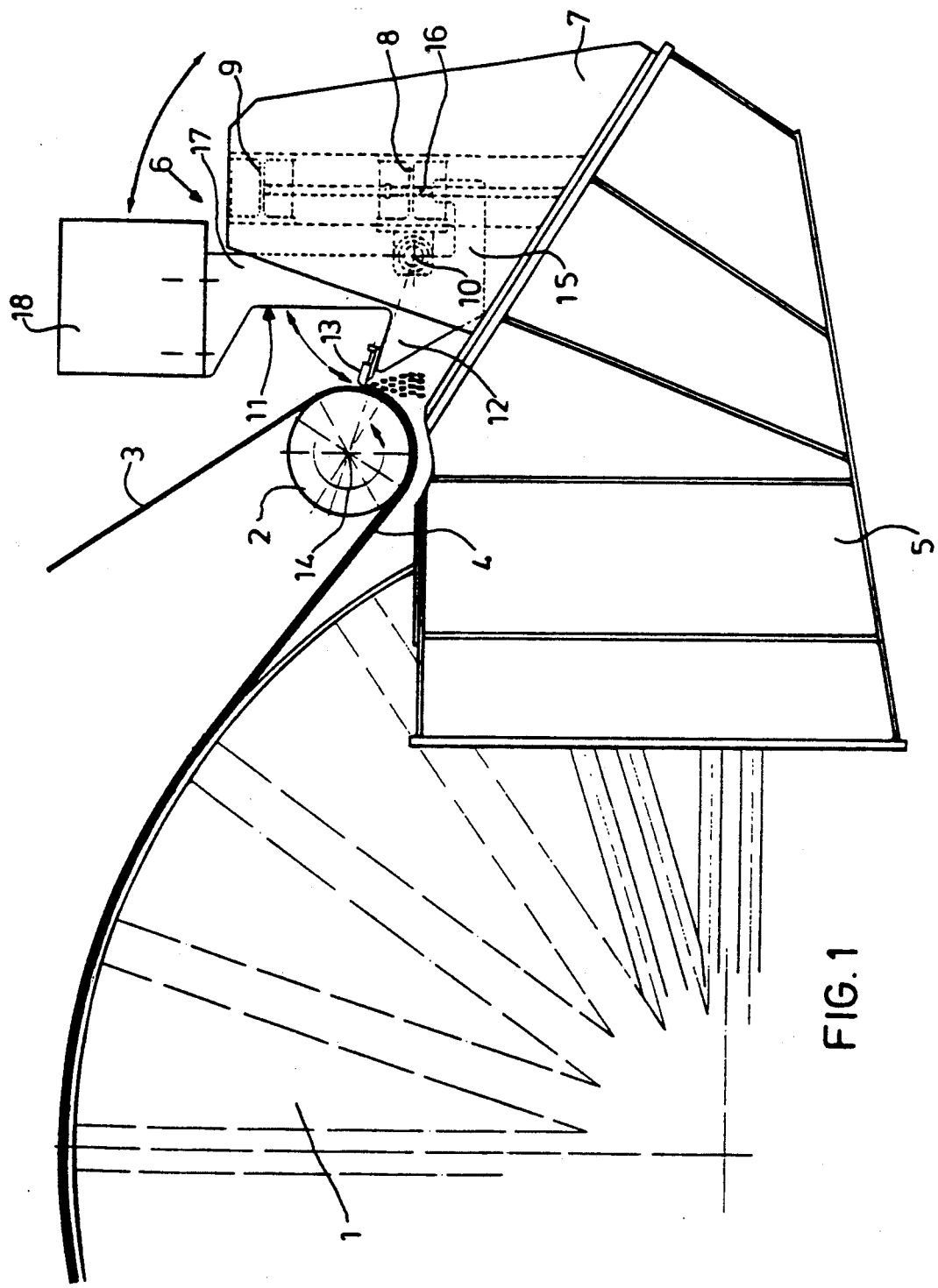

The cross bar body member of the stripping device of this invention is provided with a weight mass to provide the necessary force acting against the direction of movement of the belt whereby the scraper blades have sufficient force of scrape filter cake from the belt. The structure and operation of the stripping device of this invention will now be described in connection with the drawing but is not limited to the specific embodiment illustrated therein.

The cross bar body member (12) is so designed such that it carries a force in the form of a weight (18) of adjustable magnitude whose center of gravity must always be situated between the transverse shaft (10) and the belt (3) when the scraper (13) is under a normal load due to the scraping process. The lever arm to the transverse shaft (10) and hence the force acting on the filter cake (4) through the scraper (13) may be adjusted as desired by displacement of the weight (18) which can than be fixed in position. The tie bar (9) also functions as safety device against overthrow so that the tilting device (11) is not overthrown when under too great a load.

Thus, the stripping device (6) of the present invention which removes filter cake (4) adhering to the belt (3) of a rotary belt filter has a cross bar type of body (12) which extends transversely to the belt (3) and on which scrapers (13) directed towards the belt (3) are fixed. The device is further characterized in that the cross bar type of body (12) is part of a tilting device (11) which is designed to pivot about a transverse shaft (10) arranged parallel to the cross bar type of body (12) and is subjected to a force (18) acting against the direction of movement of the belt (3), and in that a stop (16) acting against the direction of this force (18) is provided. The stop (16) is adjustable so that the magnitude of the force can be limited. Also tie bar (9) serves as a safety device against overthrow of the tilting device (11) where a temporarily large load arises. Accordingly, the magnitude of the force (18) can be adjusted between predetermined minima and maxima of force under which the scraper blades operate.

The drawing also illustrates a drum (1) which may be of a vacuum pressure rotary belt filter, and a small deflecting roller (2) over which the belt (3) is trained. A supporting bracket (5) is provided for the variable adjustment arrangement of the stripping device, and lateral bearing blocks (7) support the cross bars (8, 9). The deflecting roller (2) rotates about an axis (14) and this axis forms an imaginary scraper plane with the transverse shaft (10).

The lower section of the stop arm (15) is supported on transverse axis (10) and this section brings into effect the specific scraping movement produced by the weight and its respective lever arm. The lower section (15) is designed to ensure automatic deflection of the scraper (13) when foreign elements are encountered and automatic return to the original operating position. The stop arm has an upper section (17) which supports the weight (18).

The stripping device (6) and its use will now be explained by way of example:

A suspension example titanium dioxide is filtered through a pressure belt rotary filter. Due to the consistency of the filter cake (4), a force of 3 kg/cm is required for scraping this filter cake (4) from the belt. This force is adjusted by means of the weight (18). The scrapers (13) have a length of 20 cm. This means that, for example, if the belt (3) has an irregularity (elevation) e.g. of 1 cm, this uneven part of the belt is subjected to a force of 60 kg, which is not sufficient to damage the rubber top layer of the belt (3). If this force is exceeded by counter-forces, the tilting device (11) tilts back.

What is claimed is:

1. A stripping device for removing a filter cake adhering to a rotary belt filter comprising a cross bar extending transversely to the filter belt, scrapers fixed to the cross bar and directed toward the filter belt without making contact with the belt, a tilting device connected to the cross bar pivotable about a transverse shaft arranged parallel to the cross bar, a weight adjustably connected to the tilting device having a center of gravity between the transverse shaft and the belt filter for providing an adjustable force to the scrapers against the direction of movement of the filter belt, adjustable stop means acting against the direction of the force provided by the weight, and a safety device preventing overthrow of the tilting device beyond a predetermined distance which enables automatic return of the tilting device and the scrapers.

* * * * *